(12) United States Patent
Bobbitt et al.

(10) Patent No.: US 9,197,868 B2
(45) Date of Patent: *Nov. 24, 2015

(54) OPTIMIZING VIDEO STREAM PROCESSING

(71) Applicant: International Business Machines Corporation, Armonk, NY (US)

(72) Inventors: Russell P. Bobbitt, New York, NY (US); Quanfu Fan, Somerville, MA (US); Sachiko Miyazawa, White Plains, NY (US); Sharathchandra U. Pankanti, Darien, CT (US); Yun Zhai, Bedford Hills, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/022,324

(22) Filed: Sep. 10, 2013

(65) Prior Publication Data
US 2014/0009620 A1 Jan. 9, 2014

Related U.S. Application Data

(63) Continuation of application No. 13/559,996, filed on Jul. 27, 2012, now abandoned, and a continuation of application No. 12/697,530, filed on Feb. 1, 2010, now Pat. No. 8,259,175.

(51) Int. Cl.
H04N 7/18 (2006.01)
G06K 9/00 (2006.01)

(52) U.S. Cl.
CPC ............ *H04N 7/188* (2013.01); *G06K 9/00771* (2013.01); *G06K 9/00993* (2013.01); *H04N 7/181* (2013.01)

(58) Field of Classification Search
CPC ... H04N 7/188; H04N 7/181; G06K 9/00771; G06K 9/00993
USPC ........... 348/150; 382/100; 709/219, 231, 232; 706/47, 52
See application file for complete search history.

(56) References Cited

U.S. PATENT DOCUMENTS 4,630,110 A 12/1986 Cotton et al.
5,494,136 A * 2/1996 Humble .......................... 186/61
(Continued)

FOREIGN PATENT DOCUMENTS

CN 101268478 A 9/2008
EP 0664034 B1 11/2001
(Continued)

OTHER PUBLICATIONS

GB Examination Report Issued Mar. 26, 2015 re Application No. GB1206960.5 of International Business Machines Corporation.
(Continued)

*Primary Examiner* — Anthony Mejia
(74) *Attorney, Agent, or Firm* — Patrick J. Daugherty; Driggs, Hogg, Daugherty & Del Zoppo Co., LPA

(57) ABSTRACT

Transaction units of video data and transaction data captured from different checkout lanes are prioritized as a function of lane priority values of respective ones of the different checkout lanes from which the transaction units are acquired. Each of the checkout lanes has a different lane priority value. The individual transaction units are processed in the prioritized processing order to automatically detect irregular activities indicated by the transaction unit video and the transaction data of the processed individual transaction units.

20 Claims, 7 Drawing Sheets

(56) References Cited

U.S. PATENT DOCUMENTS

| | | | |
|---|---|---|---|
| 5,883,968 | A * | 3/1999 | Welch et al. .................. 382/100 |
| 6,571,218 | B1 | 5/2003 | Sadler |
| 6,974,083 | B1 * | 12/2005 | Kahn et al. ............... 235/462.14 |
| 7,015,945 | B1 | 3/2006 | Sullivan |
| 7,209,891 | B1 | 4/2007 | Addy et al. |
| 7,229,012 | B1 * | 6/2007 | Enright et al. ................ 235/379 |
| 7,416,118 | B2 * | 8/2008 | Throckmorton et al. ..... 235/383 |
| 7,516,888 | B1 * | 4/2009 | Kundu et al. ................. 235/383 |
| 7,631,808 | B2 | 12/2009 | Kundu et al. |
| 7,721,336 | B1 * | 5/2010 | Adjaoute ........................ 726/25 |
| 7,925,536 | B2 | 4/2011 | Lipton et al. |
| 7,962,365 | B2 | 6/2011 | Bobbitt et al. |
| 7,965,184 | B1 * | 6/2011 | Nichols et al. ............ 340/568.7 |
| 2002/0170782 | A1 | 11/2002 | Millikan |
| 2004/0059614 | A1 * | 3/2004 | Brown et al. ..................... 705/8 |
| 2005/0102183 | A1 * | 5/2005 | Kelliher et al. ................. 705/16 |
| 2005/0146605 | A1 | 7/2005 | Lipton et al. |
| 2006/0190960 | A1 | 8/2006 | Barker |
| 2006/0243798 | A1 * | 11/2006 | Kundu et al. ................. 235/383 |
| 2007/0182818 | A1 * | 8/2007 | Buehler ........................ 348/143 |
| 2007/0253595 | A1 | 11/2007 | Sorensen |
| 2008/0018738 | A1 | 1/2008 | Lipton et al. |
| 2008/0162952 | A1 | 7/2008 | Landers et al. |
| 2008/0184245 | A1 | 7/2008 | St-Jean |
| 2008/0208698 | A1 * | 8/2008 | Olson et al. ..................... 705/21 |
| 2008/0290182 | A1 | 11/2008 | Bell et al. |
| 2008/0294475 | A1 | 11/2008 | Zenor et al. |
| 2009/0034797 | A1 | 2/2009 | Senior |
| 2009/0076922 | A1 | 3/2009 | de Gruil |
| 2009/0201372 | A1 * | 8/2009 | O'Doherty et al. ........... 348/150 |
| 2009/0226099 | A1 * | 9/2009 | Kundu et al. ................. 382/224 |
| 2009/0234683 | A1 * | 9/2009 | Anderson et al. ................. 705/7 |
| 2009/0327054 | A1 * | 12/2009 | Yao et al. ........................ 705/12 |
| 2010/0030859 | A1 * | 2/2010 | Huang .......................... 709/206 |
| 2010/0057858 | A1 * | 3/2010 | Shen et al. .................... 709/206 |
| 2010/0059589 | A1 * | 3/2010 | Goncalves et al. ........... 235/383 |
| 2010/0059598 | A1 | 3/2010 | Lindgren et al. |
| 2010/0114623 | A1 * | 5/2010 | Bobbitt et al. ..................... 705/7 |
| 2010/0134624 | A1 * | 6/2010 | Bobbitt et al. ................. 348/150 |
| 2010/0161526 | A1 * | 6/2010 | Zhang et al. .................... 706/12 |
| 2010/0318544 | A1 * | 12/2010 | Nicolov ......................... 707/759 |
| 2011/0188701 | A1 | 8/2011 | Bobbitt et al. |

FOREIGN PATENT DOCUMENTS

| | | |
|---|---|---|
| JP | H09115028 A | 5/1997 |
| JP | H09259381 A | 10/1997 |
| WO | WO2006105376 A2 | 10/2006 |

OTHER PUBLICATIONS

Yokosato, Jun-ichi, "A study of method to transport multiple video streams applied to Surveillance System", Proceedings of the 68th National Convention of IPSJ in 2006 (#3), Database and Media Network, Information Processing Society of Japan (IPSJ), Mar. 7, 2006, pp. 3-417 to 3-418.

Okumura, Seiji, "A study of method to transport multiple video streams applied to Surveillance System", Proceedings of the 2006 IEICE General Conference, Communication 2, Institute of Electronics, Information and Communication Engineers (IEICE), Mar. 8, 2006, p. 202.

Shin, Junsuk, et ai, "ASAP: A Camera Sensor Network for Situation Awareness", Springer-Verlag Berlin Heidelberg, Lecture Notes in Computer Science, vol. 4878,2007, pp. 31 to 47.

Fan et al., "Detecting Sweethearting in Retail Sureveillance Videos", 2009, Proceeding ICASSP '09 Proceedings of the 2009, IEEE International Conference on Acoustics, Speech and Signal Processing, pp. 1449-1452.

Venetianer et al., "Video Verification of Point of Sale Transactions", 2007, IEEE Advanced Video and Signal Based Surveillance (AVSS 2007) Conference on Sep. 5-7, 2007, pp. 411-416.

Nuno Vasconcelos et ai, "Statistical Models of Video Structure for Content Analysis and Characterization", IEEE Transaction on Image Processing, IEEE Service Center, Piscataway, NJ, US, vol. 9, No. 1, 01/0112000.

Oishi Wu et ai, "Monitoring Security Events using Integrated Correlation-based Techniques", Proceedings of the 5th Annual Workshop on Cyber Security and Information Intelligence Research Cyber Security and Information D Intelligence Challenges and Strategies, CSIIRW '09,Jan. 1, 2009.

U.S. Appl. No. 12/697,530, filed Feb. 1, 2010.

Non-Final Office Action (Mail Date Jan. 9, 2012) for U.S. Appl. No. 12/697,530, filed Feb. 1, 2010.

Response (File Date Apr. 9, 2012) to Non-Final Office Action (Mail Date Jan. 9, 2012) for U.S. Appl. No. 12/697,530, filed Feb. 1, 2010.

Notice of Allowance (Mail Date May 1, 2012) for U.S. Appl. No. 12/697,530, filed Feb. 1, 2010.

International Search Report for PCT/EP2011/050098 dated Jan. 5, 2011.

Japanese Application No. JP20120550379, filed Jan. 5, 2011.

British Application No. GB20120006960, filed Jan. 5, 2011.

PCT Application No. WO2011EP50098,filed Jan. 5, 2011.

German Application No. DE201111100093T, filed Jan. 5, 2011.

Chinese Application No. CN2011806602, filed Jan. 5, 2011.

U.S. Appl. No. 13/559,996, filed Jul. 27, 2012.

Amendment and Terminal Disclaimer (File Date Jun. 17, 2013) for U.S. Appl. No. 13/559,996, filed Jul. 27, 2012.

Notice of Allowance (Mail Date Jun. 27, 2013) for U.S. Appl. No. 13/559,996, filed Jul. 27, 2012.

* cited by examiner

OPTIMIZING VIDEO STREAM PROCESSING

CROSS-REFERENCE TO RELATED APPLICATIONS

This application is a continuation of U.S. application Ser. No. 13/559,996, filed Jul. 27, 2012, which is a continuation of U.S. application Ser. No. 12/697,530, filed Feb. 1, 2010, now U.S. Pat. No. 8,259,175 B2, issued Sep. 4, 2012.

FIELD OF THE INVENTION

The present invention generally relates to video surveillance, and more particularly relates to using a computer infrastructure to prioritize the processing of multiple video streams.

BACKGROUND

Video surveillance in a retail environment is a common practice. However, it remains resource intensive to process captured video to automatically detect irregular activities. In retail environment, in order to automatically capture irregular activities such as cashier frauds at check-out lanes, sophisticated and resource intensive computerized pattern recognition algorithms need to be executed. By multiplying by the scale of the lanes (10~20 each store and thousands nationwide), a significant amount of computational power is required to handle the huge volume of output generated by complex computer processing.

In addition, each store usually has only limited space and resources to handle all point-of-sale (POS) transactions and associated video streams. Available space may be sufficient for smaller stores that have fewer lanes, but it is not sufficient for larger stores with 15~20 lanes, or even more. At the same time, retailers are not always willing to invest more into the hardware, software and services necessary to keep up with the need.

As a result, if the available computational resources cannot keep up with the need, useful information will be dropped due to this shortage, e.g., frames are dropped in the video streams and/or processing is limited to only a subset of video streams. This may cause many irregular activities to be missed, resulting in severe loss to the retailers.

SUMMARY

In one method aspect of the present invention, transaction units of video data and transaction data captured from different checkout lanes are prioritized as a function of lane priority values of respective ones of the different checkout lanes from which the transaction units are acquired. Each of the checkout lanes has a different lane priority value. The individual transaction units are processed in the prioritized processing order to automatically detect irregular activities indicated by the transaction unit video and the transaction data of the processed individual transaction units.

In another aspect of the present invention, a computer program product includes a computer-readable storage medium having computer-readable program code embodied in the storage medium. The computer readable program code includes instructions that, when executed by a processor, cause the processor to prioritize transaction units of video data and transaction data captured from different checkout lanes as a function of lane priority values of respective ones of the different checkout lanes from which the transaction units are acquired. Each of the checkout lanes has a different lane priority value. The individual transaction units are processed in the prioritized processing order to automatically detect irregular activities indicated by the transaction unit video and the transaction data of the processed individual transaction units.

In another aspect of the present invention, a system has a memory and at least one processor coupled to the memory and operative to determine processing priority for each transaction unit of individual transaction units including video and transaction data. More particularly, transaction units of video data and transaction data captured from different checkout lanes are prioritized as a function of lane priority values of respective ones of the different checkout lanes that the transaction units are acquired from. Each of the checkout lanes has a different lane priority value. The individual transaction units are processed in the prioritized processing order to automatically detect irregular activities indicated by the transaction unit video and the transaction data of the processed individual transaction units.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various aspects of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
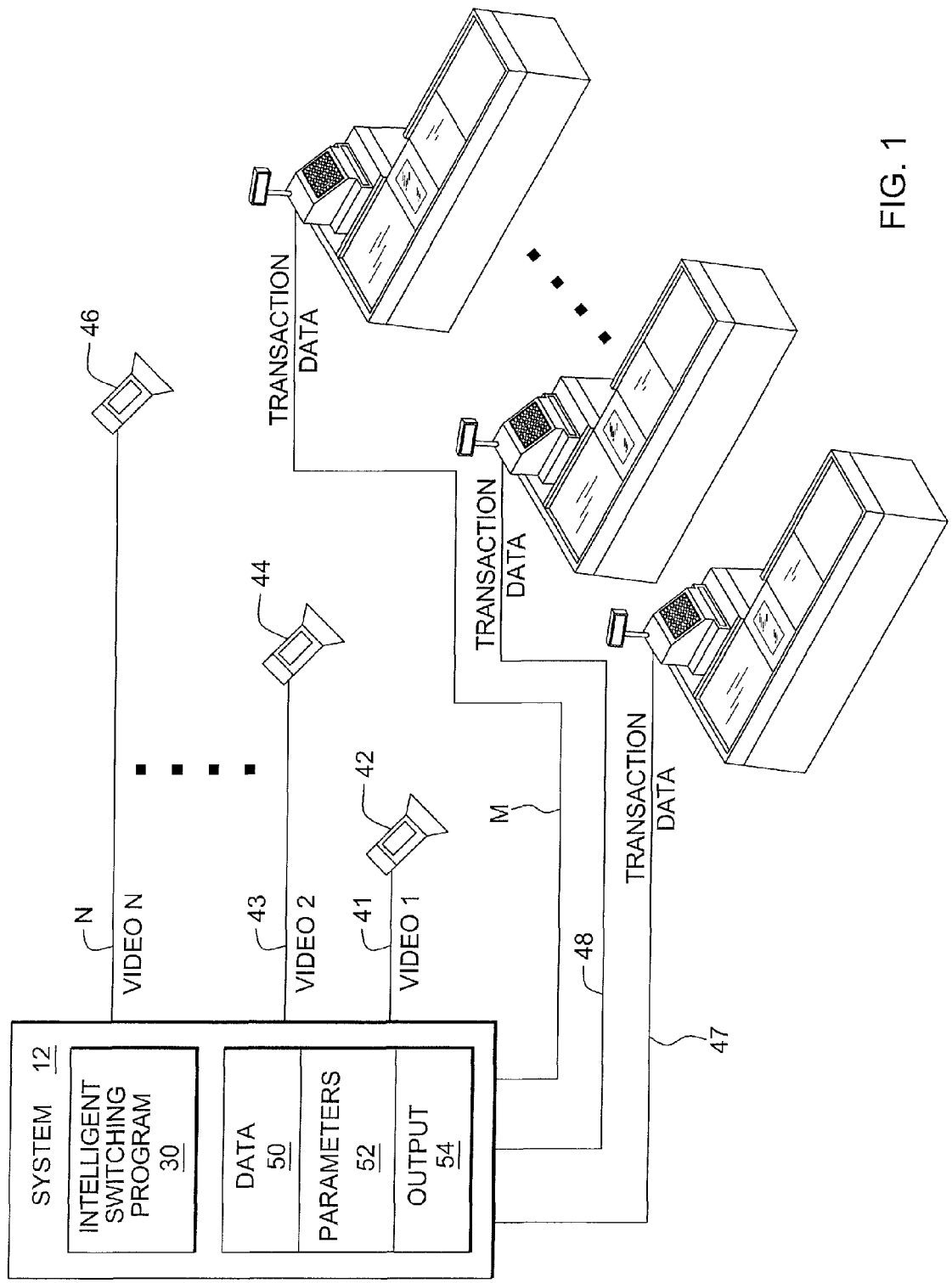
FIG. 1 shows an illustrative environment for a system for prioritizing multiple video streams processing according to an aspect of the invention.

The present invention generally relates to video surveillance, and more particularly relates to using a computer infrastructure to prioritize the processing of multiple video streams in a retail environment.

Aspects of the invention aim to address the scalability issue encountered in retail stores, where computational power is often insufficient to monitor all check-out lanes simultaneously for irregular activities such as cashier frauds, particularly during periods of high activity (e.g., during the holiday shopping season).

Aspects of the invention involve implementation of an intelligent switching program, whereby the processing power required to monitor check-out stations is considerably reduced. In an aspect, the present invention monitors a subset of check-out stations at any given time, instead of monitoring all check-out stations at all times. The subset of check-out stations may be determined dynamically according to, but not limited to, cashier records, input parameters from the manager, current lane activity, past lane activity, time of day, etc. Statistical models, e.g., effective population sampling and/or population hypothesis tests, are developed based on the above variables to guide the lane selection process, whereby increases in the false-negative rate due to failure to monitor particular lanes when events of interest occur are controlled. By monitoring fewer check-out stations, while maintaining target performance accuracy, the amount of data that end users must deal with is significantly reduced.

According to an aspect of the invention, it is assumed that there are N check-out lanes to monitor and a single processing machine equipped with an irregular activity capture module. During any unit time period, e.g., 10 seconds, the system may be able to process a desired number of transactions. Thus, the present invention develops an intelligent switching program for lane selection and dynamically allocates processing power to different lanes from time to time. The system is also capable of dynamically adjusting its allocation based on real-time incoming data.

In an aspect of the invention, the processing power can be located at a different location from the check-out lanes and can monitor check-out lanes from more than one store at various locations. The processing power can also process historical data along with real-time data.

According to an aspect of the invention, there may be shared computational resources among different retail stores. For example, a regional or national processing center may provide backup to any overloaded individual store. In this case, each store initially has its own scheduling and prioritization procedures to handle its own transactions. If there are transactions with high priorities that cannot be handled by local computational resources, a request will be sent to the regional or national processing center to process the load. Since different stores may have different problem definitions, the higher level processing unit does not necessarily contain the same analytic modules as individual stores do.

The processing unit at the regional or national processing center may just provide the computational power, while what to compute is defined by the requests sent by the individual stores. The requests sent by the individual stores include the transaction data, video streams and the task definitions. Transaction data refers to data from POS devices including customer number, prices, item numbers, quantities, discounts, voids, etc. The processing units could reside in the same physical location, or they could be in distributed form and be referenced by their virtual/logical addresses.

Further aspects of the present invention provide an open architecture to integrate processing from different locations as well as different retailers. When the computational resource of one vendor is limited, a higher-level processing unit could allocate free resources from another vendor to assume the burden.

In prioritizing the processing of multiple video streams, the processing power may rely on a set of initial rules that are capable of being dynamically updated. The initial input of the monitoring system may include, but is not limited to: user preference, e.g., Lane 10 is considered sensitive and so should have more focus than other lanes; more focus should be placed on a particular cashier when he or she is on duty; historical data: e.g., the transaction volume on past Sundays, usual time of day, date, day of the week, etc. A set of statistical sampling and population estimation techniques (e.g., hypothesis testing) are employed to further enforce the confidence of the prioritization process.

Based on the initial system input described above, the selective monitoring unit may initiate a statistical sampling process to allocate computational resources, such that the lanes or the lanes occupied by certain cashiers receive more focus than others. The sampling process is based on statistical inference techniques with context-aware (retail) prior information and mathematical models.

In an aspect of the invention, as the system continues to be provided with new information, it can dynamically adjust its computational resource allocation. To maintain the target capture accuracy, the intelligent switching program may adjust its focus to lanes with a higher processing rate. The system should have a different profile for different time periods during a day. This could be pre-defined as the initial input. In addition, the volume of particular types of transactions can trigger the intelligent switching program to change focus. For instance, if one lane produces more "void transaction" events than others, the system may adjust its focus to process more transactions from this lane. In other words, if a lane/cashier produces more "candidate" irregular activities such as cashier frauds, the system may put more focus on the lane and/or cashier.

In an aspect of the invention, the event triggers for the intelligent switching program to switch focus may not be evaluated independently from each other. Rather, they may be modeled as a joint distribution as there may be a strong correlation among them. Common feature models may be used, such as Gaussian, Poisson, exponential, uniform, etc.

Hypothesis tests and statistical sampling processes are carefully designed such that the target irregular activity capture accuracy is maintained, e.g., how many items from a lane and/or a cashier the system should process to maintain a 75% capture rate. This is highly context related, and standard statistical methods are modified to fit an application.

In addition, a prescheduling module determines whether a particular lane should be monitored at any given time based on whether the lane is open. Prior to the processing by the intelligent switching program to prioritize the processing of the video streams, some preprocessing is performed by a preprocessing module on all lanes to produce intermediate transactions. These intermediate transactions provide transaction units for further processing. A transaction unit contains transaction video which corresponds to a set of items purchased by a single customer in a single span of time.

The intermediate features along with prior information are used to decide which transactions should receive prioritized processing (e.g., to catch cashier irregular activity). Results are archived for human perusal and validation.

Turning to the drawings, FIG. 1 shows an illustrative environment for prioritizing the processing of multiple video streams according to an aspect of the invention. To this extent, at least one camera 42 captures activities in a checkout lane. Camera 44 and camera 46 each capture activities in a different checkout lane. Accordingly, a digital video input 41 from camera 42, a digital video input 43 from camera 44, a digital video input N from camera 46 are obtained and sent to a system 12 that includes, for example, an intelligent switching program 30, data 50, parameters 52, output 54 and/or the like, as discussed herein. Transaction data 47, 48, and M from the each of the checkout lanes are sent to system 12 to be processed.

Figure 2:
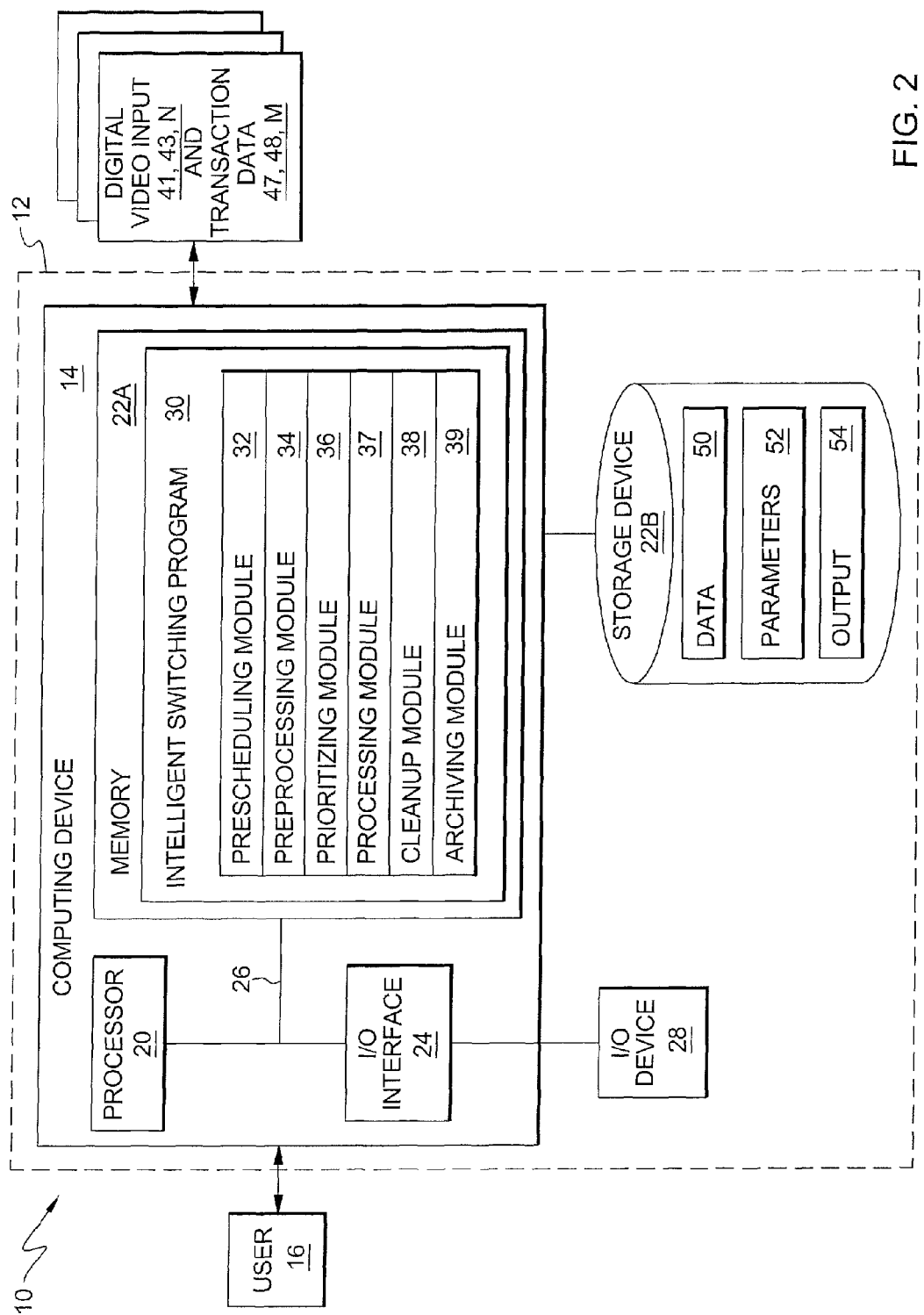
FIG. 2 shows a close up of an illustrative environment for prioritizing multiple video streams processing according to an aspect of the invention.

FIG. 2 shows a closer view of an illustrative environment 10 for prioritizing the processing of multiple video streams according to an aspect of the invention. To this extent, environment 10 includes a computer system 12 that can perform the process described herein in order to detect irregular checkout activities. In particular, computer system 12 is shown including a computing device 14 that includes an intelligent switching program 30, which makes computing device 14 operable for prioritizing the processing of multiple video streams, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as intelligent switching program 30, which is stored in a storage system, such as memory 22A and/or storage device 22B. While executing program code, processor 20 can read and/or write data, such as data 36 to/from memory 22A, storage device 22B, and/or I/O interface 24. Bus 26 provides a communications link between each of the components in computing device 14. I/O device 28 can include any device that transfers information between a user 16 and computing device 14 and/or digital video input 41, 43, N and transaction data input 47, 48, M and computing device 14. To this extent, I/O device 28 can include a user I/O device to enable an individual user 16 to interact with computing device 14 and/or a communications device to enable an element, such as digital video input 41, 43, N and transaction data input 47, 48, M to communicate with computing device 14 using any type of communications link.

In any event, computing device 14 can include any general purpose computing article of manufacture capable of executing program code installed thereon. However, it is understood that computing device 14 and intelligent switching program 30 are only representative of various possible equivalent computing devices that may perform the process described herein. To this extent, in other aspects, the functionality provided by computing device 14 and intelligent switching program 30 can be implemented by a computing article of manufacture that includes any combination of general and/or specific purpose hardware and/or program code. In each aspect, the program code and hardware can be created using standard programming and engineering techniques, respectively. Such standard programming and engineering techniques include an open architecture to allow integration of processing from different retailers. Such an open architecture includes cloud computing.

Similarly, computer system 12 is only illustrative of various types of computer systems for implementing aspects of the invention. For example, in one aspect, computer system 12 includes two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can include any combination of various types of wired and/or wireless links; include any combination of one or more types of networks; and/or utilize any combination of various types of transmission techniques and protocols.

As discussed herein, intelligent switching program 30 enables computer system 12 to detect irregular checkout activities. To this extent, intelligent switching program 30 is shown including a prescheduling module 32, a preprocessing module 34, a prioritizing module 36, a processing module 37, a cleanup module 38, and an archiving module 39. Operation of each of these modules is discussed further herein. However, it is understood that some of the various modules shown in FIG. 2 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 3:
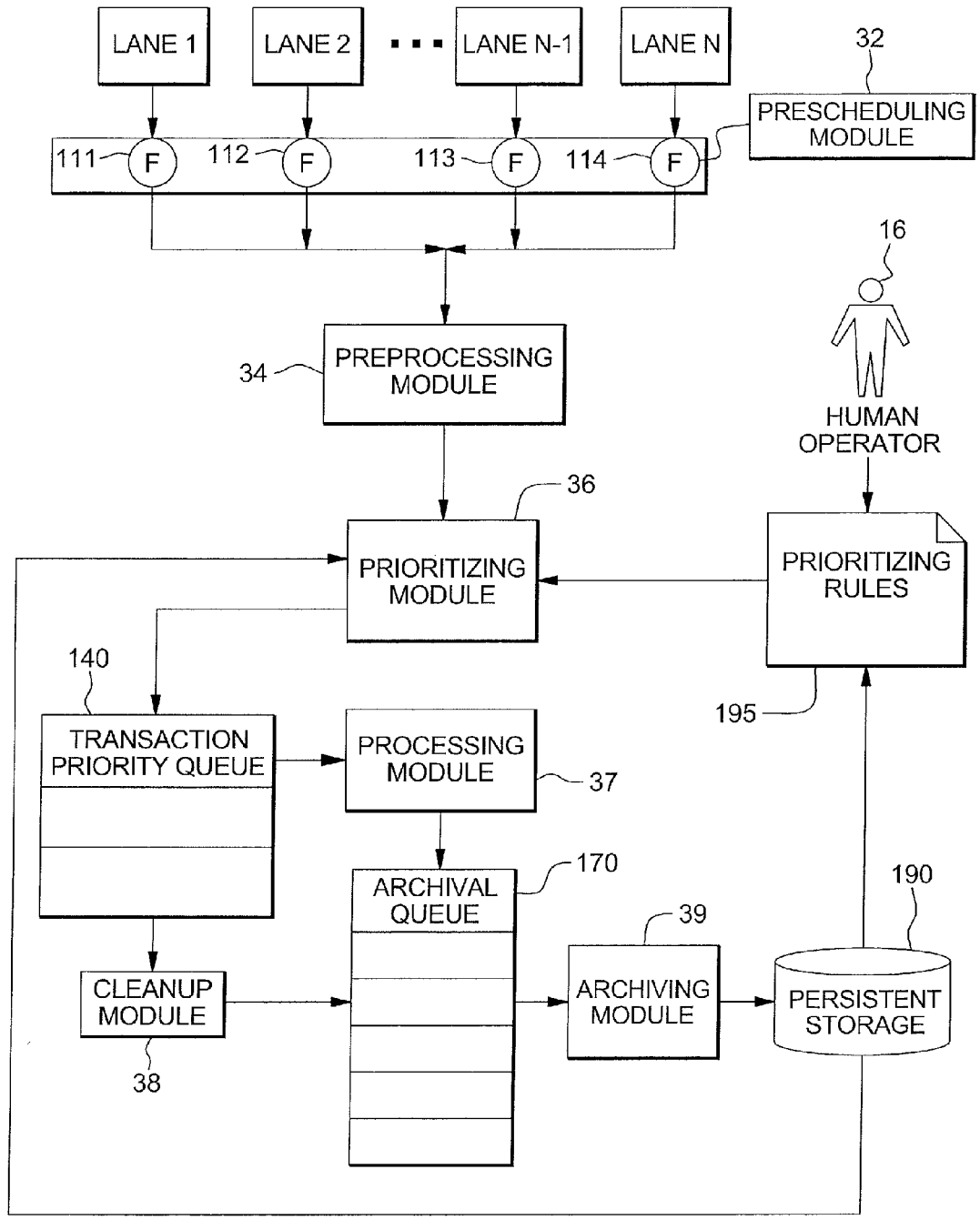
FIG. 3 illustrates a system diagram of an exemplary intelligent switching program according to an aspect of the invention.

FIG. 3 illustrates a system diagram of an exemplary video transaction intelligent switching program 30 (FIG. 2). The present invention contemplates a plurality of lanes in one or more retail stores. This non-limiting example depicts a system prioritizing the processing of multiple video streams installed in a retail store. To this extent, the retail store maintains an arbitrary number of lanes. Cameras are installed to capture transaction activities at each lane. Transaction data (e.g., prices, item numbers, quantities, etc.) is sent along with video capture of each transaction. The transaction includes both the transaction data and the video stream. This non-limiting example assumes that there are N lanes (lane 1 to lane N) to be processed as determined by a prescheduling module 32 (FIG. 2). In the prescheduling module, a prescheduling filter 111 is installed for lane 1. Likewise, another filter 112 is installed for lane 2, and filter 113 is installed for lane N−1, and filter 114 for lane N.

The prescheduling filters determine whether a transaction from a particular lane should be monitored based on whether the lane is open. All transactions from lanes are sent to the preprocessing module 34 (FIG. 2). The preprocessing module 34 organizes the transactions such that each transaction is isolated and given a unique ID. All transactions are then presented to the prioritizing module 36. The prioritizing module 36 uses predetermined rules, which are also capable of being dynamically updated, to calculate a priority score for each transaction.

The prioritizing module 36 maintains a transaction priority queue 140, which contains transactions with priority scores. Transactions are listed in the transaction priority queue 140 in the order of their priority score. The processing module 37 processes transactions with the highest priority score first from the transaction priority queue 140. The processing module 37 contains the relatively computationally-intensive irregular activity detection software to analyze each transaction to discover whether irregular activity has occurred for that particular transaction. As a transaction is processed by the processing module 37, the transaction unit for that transaction is moved to an archival queue 170.

A cleanup module 38 monitors the transaction priority queue 140 at regular time intervals. If a transaction has been in the transaction priority queue 140 for more than a predetermined amount of time (e.g., 10 seconds) and the priority score for the transaction is low, the cleanup module 38 will move the transaction to the archival queue 170.

The archiving module 39 processes transaction units in the archival queue 170 by moving the transaction units in the archival queue 170 to persistent storage 190. From persistent storage 190, data can be extracted to form part of prioritizing rules 195. Human operator 16 can also provide prioritizing rules 195. Prioritizing rules 195 are used by the prioritizing module 36 to prioritize transactions.

Figure 4A:
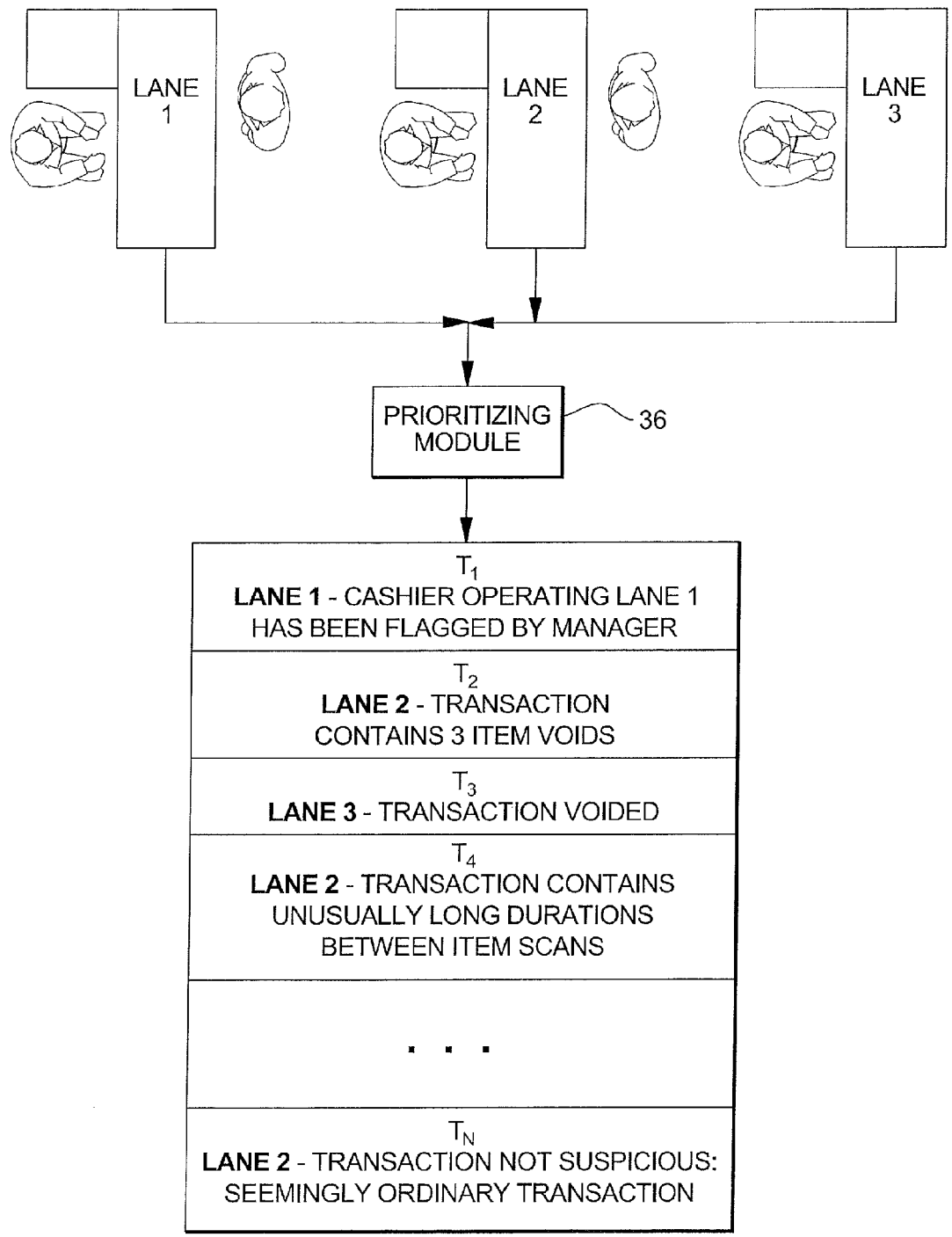
FIGS. 4A and 4B illustrate examples of calculating priorities for different transaction units.
Figure 4B:
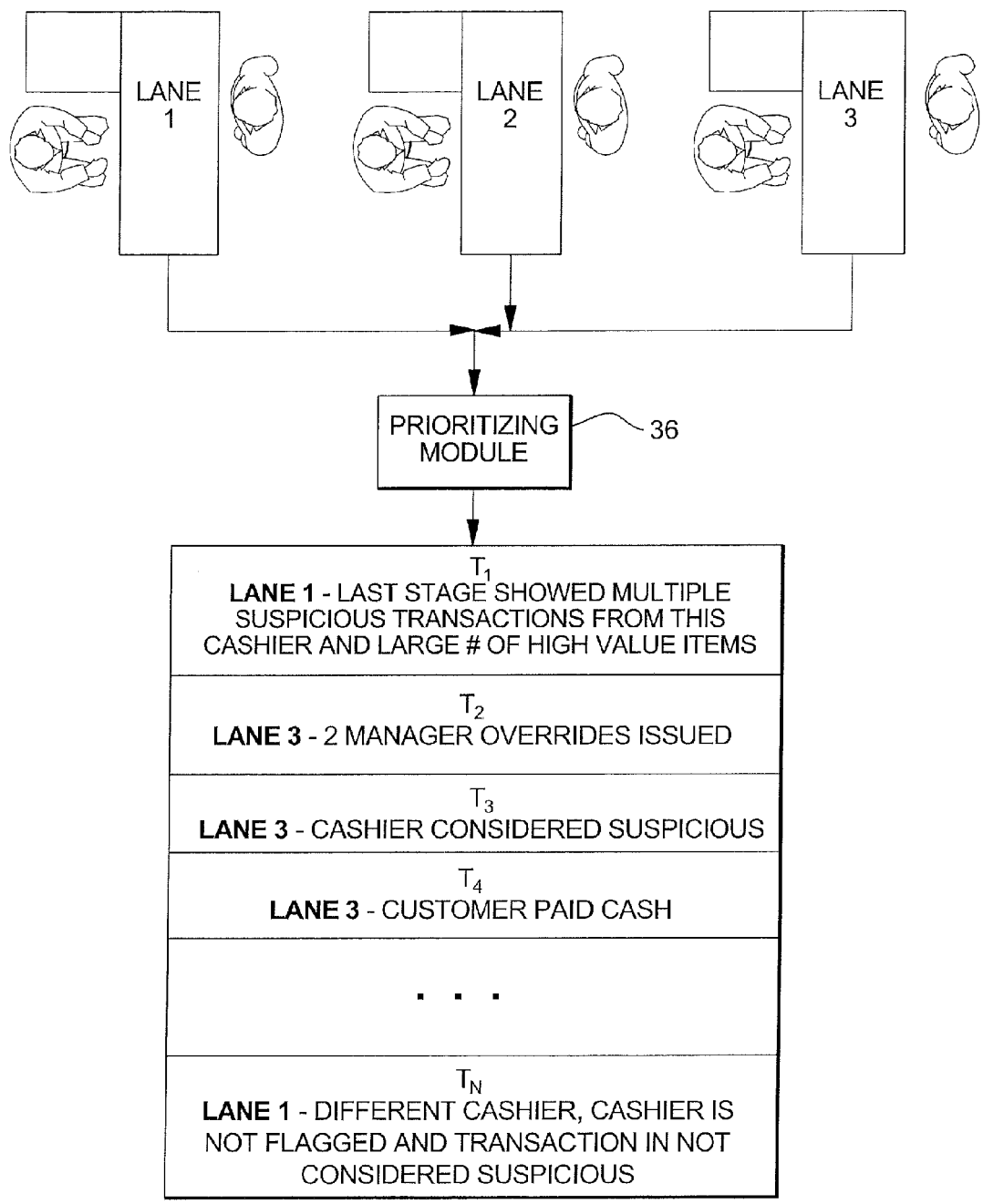

According to an aspect of the invention, when the processing module 37 has unused capacity (e.g., late at night when there are few customers or when the store is closed), unprocessed transactions from the persistent storage 190 can be sent back to the prioritizing module 36 to be reprocessed FIGS. 4A and 4B illustrate two stages of priority setting among transactions. FIG. 4A illustrates a first stage of prioritizing transactions. In this first stage, transactions from Lanes 1-3 are sent to the prioritizing module 36. Based on the prioritizing rules provided by human operator 16 and the characteristics of each transaction, the prioritizing module 36 prioritizes transactions in the order of $T_1$ to $T_N$ with $T_1$ having the highest priority.

For example, $T_1$ from Lane 1 has the highest priority because the cashier operating Lane 1 has been flagged by the manager. $T_2$ from Lane 2 is given a high priority because the transaction contains three voided items. $T_3$ from Lane 3 is also given a high priority because the entire transaction is voided. However, the priority given to $T_2$ is higher than that of $T_3$ because three voided items in a single transaction is considered a more irregular activity than voiding an entire transaction, according to the system rule design. $T_4$ from Lane 2 is given a high priority because the transaction contains unusually long durations between item scans. Long durations between scans is a possible cue that the cashier is moving items from the entry belt to the exit belt without entering the items into the transaction between items that are being entered into the transaction (i.e., the items are bagged and taken away by the customer without being purchased). There are many other reasons for long durations between items (e.g., the cashier stops to bag items), so $T_4$ is given a lower priority than $T_1$-$T_3$. In comparison, $T_N$ from Lane 2 is given low priority because it is a seemingly ordinary transaction.

FIG. 4B illustrates a second stage of prioritizing transactions. In this second stage, the prioritizing rules have been updated with the transaction data from the first stage. In the first stage, the cashier from Lane 2 issued multiple suspicious transactions. As a result, the prioritizing rules were updated based on this information.

In the second stage as illustrated by FIG. 4B, new transactions $T_1$ to $T_N$ are processed by the prioritizing module 36. $T_1$ from Lane 2 is given top priority because the first stage showed multiple suspicious transactions from the same cashier and a large number of high value items. $T_2$ from Lane 3 is given a high priority because the same cashier from Lane 3 had two managerial overwrites issued. $T_3$ from Lane 3 is given high priority because the same cashier is considered suspicious. $T_4$ is given high priority because a customer pays cash. Paying in cash means that the identity of buyer is not recorded as it would be, for example, in a credit card transaction, so there is a correlation between cash purchases and fraud. However, the correlation is not very strong relative to the items that are prioritized ahead of it. $T_N$ is given low priority because a different cashier now works at Lane 1 and the cashier is not flagged as suspicious. In addition, the transaction $T_N$ is an ordinary, non-suspicious transaction.

Figure 5:
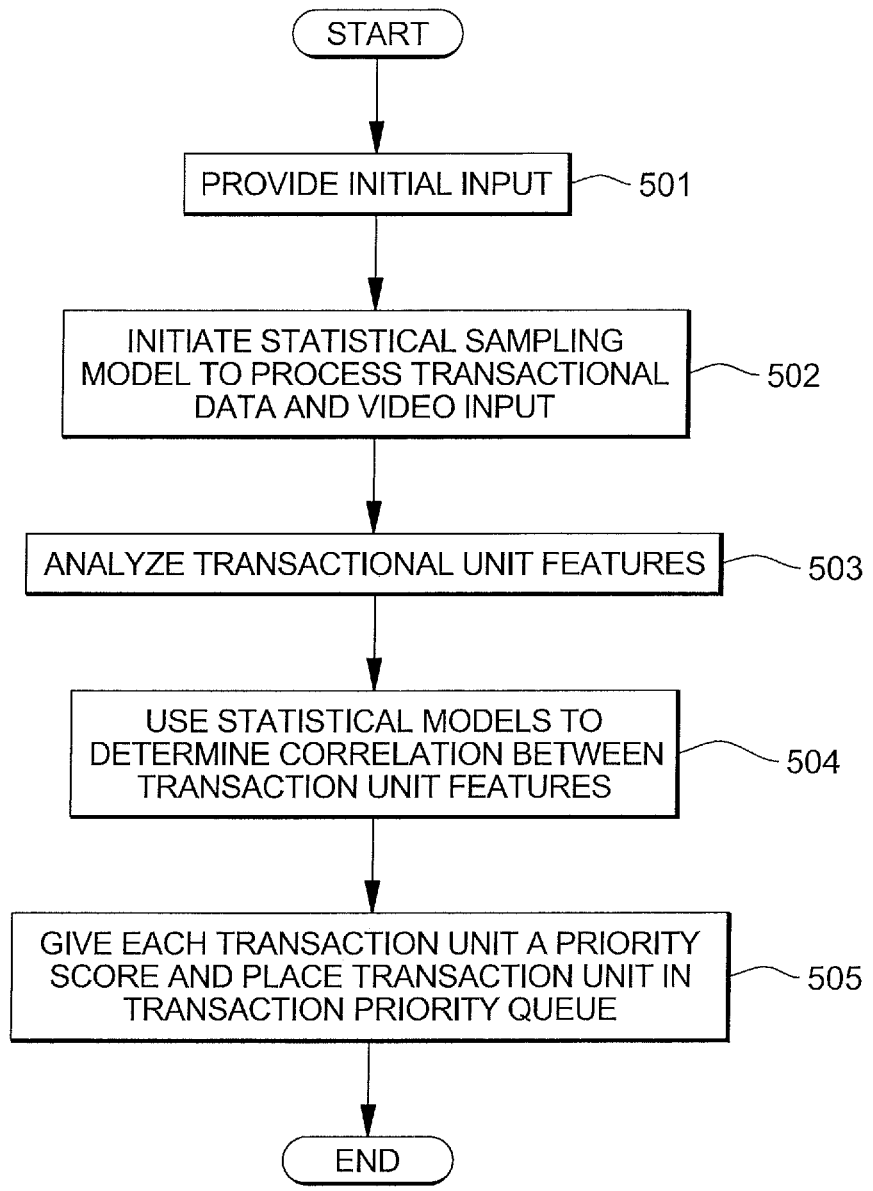
FIG. 5 illustrates a flowchart for exemplary steps of prioritizing multiple video streams processing according to an aspect of the invention.

FIG. 5 illustrates a flowchart for exemplary steps of assigning priorities for transaction units. In step 501, the intelligent switching program takes initial input for assigning priorities. In step 502, the intelligent switching program initiates a statistical sampling model to process transactional data and video stream, which is combined into a transaction unit. In step 503, the intelligent switching program analyzes features of each transaction unit. The features includes but are not limited to: activity level at each lane, e.g., can be obtained by analyzing the object detection and tracking algorithms; volume of transactions in terms of both number of transactions and monetary amounts; and results of irregular activity detections in the near history which is also used to update the historical data to affect future transaction priority ordering. In step 504, the intelligent system uses statistical models (e.g., Gaussian, Poisson, exponential, uniform, etc.) to determine correlations between features of the transaction units. In step 505, each transaction unit is given a priority score based on analysis results and placed in the transaction priority queue.

Figure 6:
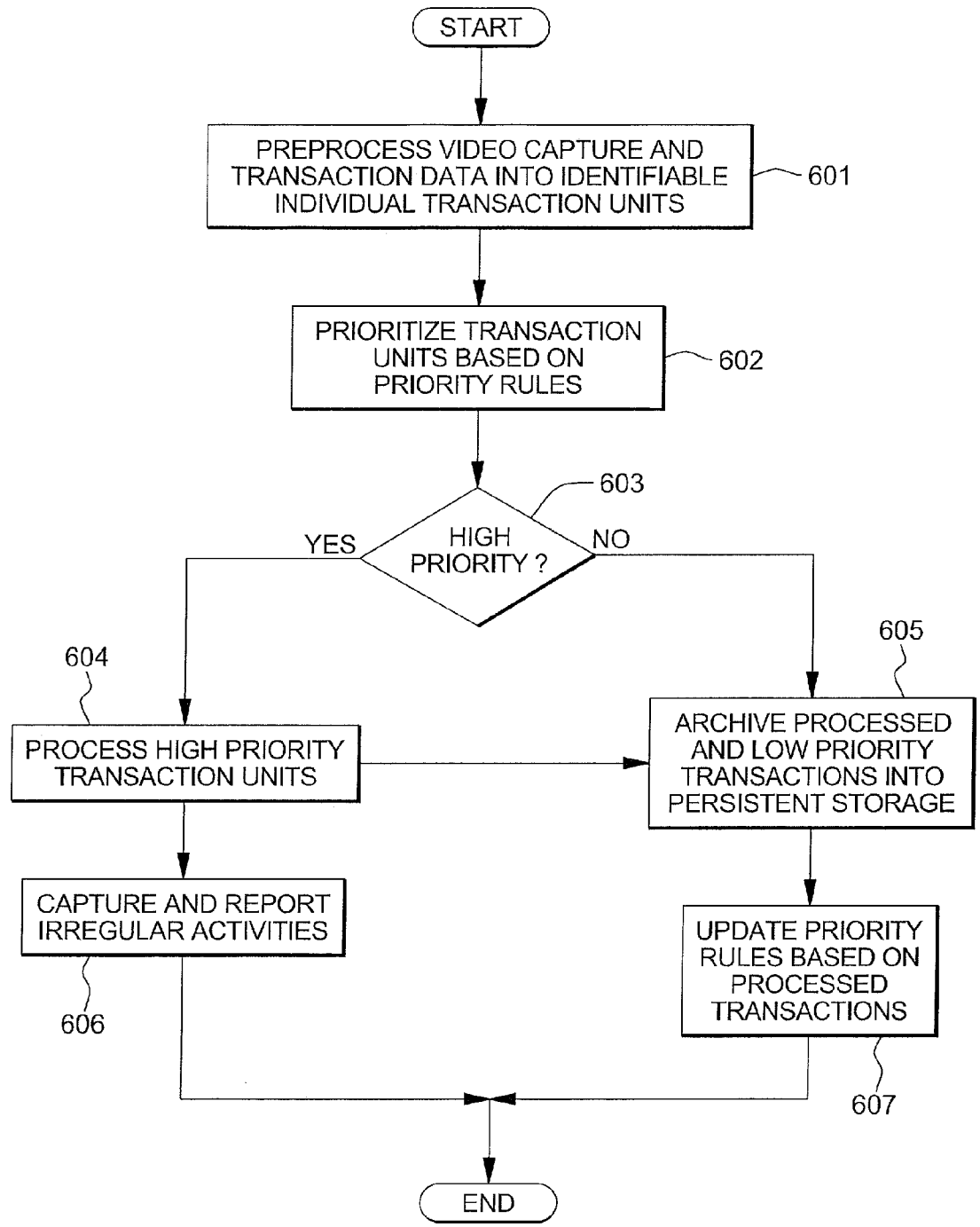
FIG. 6 illustrates a flowchart for exemplary steps of assigning priorities for multiple video streams.

FIG. 6 illustrates a flowchart for exemplary steps of processing transactions according to the present invention. In step 601, the monitoring system preprocesses video capture and transaction data and turns them into identifiable individual transaction units. In step 602, the prioritizing system prioritizes the individual transaction units based on priority rules. In step 603, the system determines whether a transaction unit has high enough priority to be processed. If the transaction unit has relatively high priority, the transaction is processed in step 604. If the transaction unit does not have high priority in step 603, the transaction unit is archived directly in step 605. After the transaction unit is processed in step 604, irregular activities are captured and reported in step 606. Processed transactions from step 604 are also archived in step 605. An analysis of all transactions from step 605 provides the basis for updating prioritizing rules in step 607.

What is claimed is:

1. A computer implemented method, comprising executing on a processer the steps of:
    combining, via statistical sampling model processing, transaction data and video stream data into a plurality of individual transaction units that each comprise transaction data and video data corresponding to an item purchased by a customer at one of a plurality of different checkout lanes;
    prioritizing each transaction unit of the plurality of individual transaction units into a prioritized processing order as a function of lane priority values of respective ones of the different checkout lanes that the transaction unit video data and transaction data is captured from for each of the individual transaction units, wherein each of the different checkout lanes has a different lane priority value; and
    processing the individual transaction units in the prioritized processing order to automatically detect irregular activities indicated by the transaction unit video and the transaction data of the processed individual transaction units.

2. The method of claim 1, further comprising:
    integrating computer-readable program code into a computer system comprising the processor, a computer readable memory and a computer readable tangible storage device, wherein the computer readable program code is embodied on the computer readable tangible storage device and comprises instructions that, when executed by the processor via the computer readable memory, cause the processor to perform the steps of combining via statistical sampling model processing the transaction data and the video stream data into the plurality of individual transaction units, prioritizing each transaction unit of the plurality of individual transaction units into the prioritized processing order as the function of lane priority values of respective ones of the different checkout lanes that the transaction unit video data and transaction data is captured from for each of the individual transaction units; and processing the individual transaction units in the prioritized processing order to automatically detect irregular activities indicated by the transaction unit video and the transaction data of the processed individual transaction units.

3. The method of claim 1, further comprising:
    assigning a first of the different lane priority values to a first of the different checkout lanes in response to determining that a first transaction within transaction data from the first lane comprises a plurality of voided items; and
    assigning a second of the different lane priority values to a second of the different checkout lanes in response to determining that a second transaction within transaction data from the second lane comprises a voiding of all items within the second transaction.

4. The method of claim 3, further comprising:
assigning a third of the different lane priority values to a third of the different checkout lanes in response to determining that a third transaction within transaction data from the third lane comprises a long time duration between item scans in the third transaction.

5. The method of claim 4, further comprising:
the processor dynamically updating the lane priority value assigned to the first checkout lane to one of the second and third lane priority value as a function processing the individual transaction units in the prioritized processing order and thereby automatically detecting within video and transaction data captured from the first checkout lane that a fourth transaction within transaction data from the first lane comprises a long time duration between item scans in the fourth transaction, or that a fifth transaction within transaction data from the first lane comprises a voiding of all items within the fifth transaction; and
subsequently determining processing priority by the processor for each transaction unit of the individual transaction units captured from others of the different checkout lanes as a function of the updated lane priority value of the first checkout lane.

6. The method of claim 5, wherein the step of the processor processing the individual transaction units in the prioritized processing order comprises:
processing a high priority fraction of a total of the prioritized individual transaction units in the prioritized processing order; and
archiving a low priority remainder fraction of the total of the individual transaction units that each have a lower priority than the high priority fraction individual transaction units within the prioritized processing order.

7. The method of claim 6, wherein the step of prioritizing the individual transaction units further comprises placing the transactions units in a transaction priority queue in an order of relative priority; and
wherein the step of the processor archiving the low priority remainder fraction of the total of the individual transaction units further comprises moving the low priority remainder fraction transaction units from the transaction priority queue to an archival queue in an order of relative priority.

8. The method of claim 7, further comprising the processor moving unprocessed transaction units from the transaction priority queue to the archival queue at regular intervals.

9. The method of claim 8, further comprising the processor processing the low priority remainder fraction individual transaction units archived in the archival queue in order of their relative queued priority to automatically detect activities indicated by the transaction unit video and the transaction data of the processed transaction units when the processor has unused capacity.

10. The method of claim 9, further comprising:
obtaining by the processor streams of video and transaction data captured from each of the plurality of different checkout lanes; and
combining by the processor the streams of video and transaction data for each respective one of the different checkout lanes into the individual transaction units so that each of the individual transaction units comprises transaction video corresponding to a set of items purchased by a single customer at one of the different checkout lanes in a single span of time.

11. A system, comprising:
a processor in communication with a computer-readable memory and a computer-readable storage device;
wherein the processor executes program instructions stored on the computer-readable storage device via the computer-readable memory and thereby:
combines, via statistical sampling model processing, transaction data and video stream data into a plurality of individual transaction units that each comprise transaction data and video data corresponding to an item purchased by a customer at one of a plurality of different checkout lanes;
prioritizes each transaction unit of the plurality of individual transaction units into a prioritized processing order as a function of lane priority values of respective ones of the different checkout lanes that the transaction unit video data and transaction data is captured from for each of the individual transaction units, wherein each of the different checkout lanes has a different lane priority value; and
processes the individual transaction units in the prioritized processing order to automatically detect irregular activities indicated by the transaction unit video and the transaction data of the processed individual transaction units.

12. The system of claim 11, wherein the processor executes the program instructions stored on the computer-readable storage device via the computer-readable memory, and thereby further:
assigns a first of the different lane priority values to a first of the different checkout lanes in response to determining that a first transaction within transaction data from the first lane comprises a plurality of voided items; and
assigns a second of the different lane priority values to a second of the different checkout lanes in response to determining that a second transaction within transaction data from the second lane comprises a voiding of all items within the second transaction.

13. The system of claim 12, wherein the processor executes the program instructions stored on the computer-readable storage device via the computer-readable memory, and thereby further:
assigns a third of the different lane priority values to a third of the different checkout lanes in response to determining that a third transaction within transaction data from the third lane comprises a long time duration between item scans in the third transaction.

14. The system of claim 13, wherein the processor executes the program instructions stored on the computer-readable storage device via the computer-readable memory, and thereby further:
dynamically updates the lane priority value assigned to the first checkout lane to one of the second and third lane priority value as a function processing the individual transaction units in the prioritized processing order and thereby automatically detecting within video and transaction data captured from the first checkout lane that a fourth transaction within transaction data from the first lane comprises a long time duration between item scans in the fourth transaction, or that a fifth transaction within transaction data from the first lane comprises a voiding of all items within the fifth transaction; and
subsequently determines processing priority for each transaction unit of the individual transaction units captured from others of the different checkout lanes as a function of the updated lane priority value of the first checkout lane.

15. The system of claim 14, wherein the processor executes the program instructions stored on the computer-readable storage device via the computer-readable memory, and thereby processes the individual transaction units in the prioritized processing by:

processing a high priority fraction of a total of the prioritized individual transaction units in the prioritized processing order; and archiving a low priority remainder fraction of the total of the individual transaction units that each have a lower priority than the high priority fraction individual transaction units within the prioritized processing order.

16. An article of manufacture, comprising:

a computer-readable tangible storage device having computer readable program code embodied therewith, the computer readable program code comprising instructions for execution by a processor, that cause the processor to:

combine, via statistical sampling model processing, transaction data and video stream data into a plurality of individual transaction units that each comprise transaction data and video data corresponding to an item purchased by a customer at one of a plurality of different checkout lanes;

prioritize each transaction unit of the plurality of individual transaction units into a prioritized processing order as a function of lane priority values of respective ones of the different checkout lanes that the transaction unit video data and transaction data is captured from for each of the individual transaction units, wherein each of the different checkout lanes has a different lane priority value; and process the individual transaction units in the prioritized processing order to automatically detect irregular activities indicated by the transaction unit video and the transaction data of the processed individual transaction units.

17. The article of manufacture of claim 16, wherein the computer-readable program code instructions for execution by the processor, further cause the processor to:

assign a first of the different lane priority values to a first of the different checkout lanes in response to determining that a first transaction within transaction data from the first lane comprises a plurality of voided items;

assign a second of the different lane priority values to a second of the different checkout lanes in response to determining that a second transaction within transaction data from the second lane comprises a voiding of all items within the second transaction; and assign a third of the different lane priority values to a third of the different checkout lanes in response to determining that a third transaction within transaction data from the third lane comprises a long time duration between item scans in the third transaction.

18. The article of manufacture of claim 17, wherein the computer-readable program code instructions for execution by the processor, further cause the processor to:

prioritize the individual transaction units by placing the transactions units in a transaction priority queue in an order of relative priority;

process a high priority fraction of a total of the prioritized individual transaction units in the transaction priority queue in the order of relative priority; and archive a low priority remainder fraction of the total of the individual transaction units that each have a lower priority than the high priority fraction individual transaction units by moving the low priority remainder fraction transaction units from the transaction priority queue to an archival queue in an order of relative priority.

19. The article of manufacture of claim 18, wherein the computer-readable program code instructions for execution by the processor, further cause the processor to process the low priority remainder fraction individual transaction units archived in the archival queue in order of their relative queued priority to automatically detect activities indicated by the transaction unit video and the transaction data of the processed transaction units when the processor has unused capacity.

20. The article of manufacture of claim 18, wherein the computer-readable program code instructions for execution by the processor, further cause the processor to:

obtain streams of video and transaction data captured from each of the plurality of different checkout lanes; and combine the streams of video and transaction data for each respective one of the different checkout lanes into the individual transaction units so that each of the individual transaction units comprises transaction video corresponding to a set of items purchased by a single customer at one of the different checkout lanes in a single span of time.

* * * * *